US010236958B2

(12) United States Patent
Zhang et al.

(10) Patent No.: US 10,236,958 B2
(45) Date of Patent: Mar. 19, 2019

(54) METHOD FOR SIGNAL TRANSMISSION TO MULTIPLE USER EQUIPMENTS UTILIZING RECIPROCITY OF WIRELESS CHANNEL

(71) Applicant: UNIVERSITY OF SCIENCE AND TECHNOLOGY OF CHINA, Hefei (CN)

(72) Inventors: Wenyi Zhang, Hefei (CN); Cong Shen, Hefei (CN); Ning Liang, Hefei (CN)

(73) Assignee: University of Science and Technology of China, Hefei (CN)

( * ) Notice: Subject to any disclaimer, the term of this patent is extended or adjusted under 35 U.S.C. 154(b) by 0 days.

(21) Appl. No.: 16/067,085

(22) PCT Filed: Mar. 21, 2016

(86) PCT No.: PCT/CN2016/076829
§ 371 (c)(1),
(2) Date: Jun. 28, 2018

(87) PCT Pub. No.: WO2017/161478
PCT Pub. Date: Sep. 28, 2017

(65) Prior Publication Data
US 2019/0013846 A1 Jan. 10, 2019

(51) Int. Cl.
*H04L 25/497* (2006.01)
*H04B 7/06* (2006.01)
*H04B 7/0413* (2017.01)

(52) U.S. Cl.
CPC ............. *H04B 7/06* (2013.01); *H04B 7/0413* (2013.01)

(58) Field of Classification Search
CPC .............. H04L 25/497; H04L 25/4975; H04L 25/03891–25/03949; H04L 5/00–5/0005; H04B 7/0426–7/0456
(Continued)

(56) References Cited

U.S. PATENT DOCUMENTS 6,006,110 A * 12/1999 Raleigh ................ H01Q 3/2605
342/367
6,144,711 A * 11/2000 Raleigh ................ H04B 7/0615
375/346
(Continued)

FOREIGN PATENT DOCUMENTS

CN 103546264 A 1/2014
CN 103929383 A 7/2014
(Continued)

OTHER PUBLICATIONS

Wang, Hairong et al., "Pilot Contamination Reduction in Very Large MIMO Multi-Cell TDD System", Journal of Signal Processing, vol. 29, No. 2, Feb. 28, 2013 (Feb. 28, 2013), 10 pages.
(Continued)

*Primary Examiner* — James M Perez
(74) *Attorney, Agent, or Firm* — Davis Wright Tremaine LLP; Michael J. Donohue

(57) ABSTRACT

The present disclosure provides a method for transmitting a signal to multiple User Equipments (UEs) utilizing reciprocity of a wireless channel. In this method, a vector channel from the base station to each UE can be converted into an equivalent Single Input Single Output (SISO) channel having a strong Light-of-Sight (LOS) component using channel feedback. In this way, a reliable signal transmission to multiple UEs can be achieved with little channel training overhead. The present disclosure has prominent advantages such as simplicity in implementation, low processing complexity and very low channel training overhead and is particularly applicable in low-speed transmission of broadcast signaling in a massive MIMO system and scenarios where the base station is to page inactive UEs.

13 Claims, 3 Drawing Sheets

(58) Field of Classification Search
USPC .............. 375/259–285, 295–296, 316–352
See application file for complete search history.

(56) References Cited

U.S. PATENT DOCUMENTS

| | | | | |
|---|---|---|---|---|
| 6,307,893 | B1* | 10/2001 | Bremer | H04L 25/497 375/296 |
| 6,324,220 | B1* | 11/2001 | Sellars | H04L 25/03343 375/233 |
| 7,126,996 | B2* | 10/2006 | Classon | H04L 1/0018 375/260 |
| 7,248,841 | B2* | 7/2007 | Agee | H04B 7/0417 455/101 |
| 7,317,764 | B2* | 1/2008 | Hochwald | H04B 7/0669 375/232 |
| 8,000,421 | B2* | 8/2011 | Takano | H04B 7/02 375/349 |
| 8,059,709 | B2* | 11/2011 | Abou Rjeily | H04B 1/7163 375/239 |
| 8,160,121 | B2* | 4/2012 | Forenza | H04B 7/0626 370/278 |
| 8,320,432 | B1* | 11/2012 | Chockalingam | H04B 7/0452 375/219 |
| 8,385,433 | B2* | 2/2013 | Wang | H04B 7/0417 375/259 |
| 8,391,251 | B2* | 3/2013 | Sun | H04W 56/003 370/336 |
| 8,451,944 | B2* | 5/2013 | Gaur | H04B 7/0426 375/296 |
| 8,498,362 | B2* | 7/2013 | Zhang | H04B 7/0417 375/267 |
| 8,654,815 | B1* | 2/2014 | Forenza | H04B 7/0626 375/141 |
| 8,711,975 | B2* | 4/2014 | Gaur | H04B 7/0426 375/296 |
| 9,100,232 | B1* | 8/2015 | Hormati | H04L 25/03343 |
| RE45,775 | E* | 10/2015 | Agee | H04W 52/265 |
| 2001/0031647 | A1* | 10/2001 | Scherzer | H04B 7/0619 455/562.1 |
| 2001/0038674 | A1* | 11/2001 | Trans | H04B 1/00 375/355 |
| 2002/0051433 | A1* | 5/2002 | Affes | H04B 1/71052 370/335 |
| 2002/0097668 | A1* | 7/2002 | Izumi | H04B 1/0475 370/208 |
| 2002/0172269 | A1* | 11/2002 | Xu | H04L 1/02 375/211 |
| 2003/0031264 | A1* | 2/2003 | Barry | H04L 25/0246 375/259 |
| 2003/0133404 | A1* | 7/2003 | Castelain | H04B 1/707 370/203 |
| 2003/0224750 | A1* | 12/2003 | Sampath | H04L 1/06 455/276.1 |
| 2004/0047426 | A1* | 3/2004 | Nissani Nissensohn | H04L 25/0204 375/259 |
| 2004/0066761 | A1* | 4/2004 | Giannakis | H03M 13/29 370/329 |
| 2004/0095907 | A1* | 5/2004 | Agee | H04B 7/0417 370/334 |
| 2006/0198459 | A1* | 9/2006 | Fischer | H04L 1/0618 375/267 |
| 2006/0274825 | A1* | 12/2006 | Cioffi | H04L 25/03343 375/222 |
| 2007/0066237 | A1* | 3/2007 | Zhang | H04B 7/0452 455/69 |
| 2007/0066238 | A1* | 3/2007 | Zhang | H04B 7/0617 455/69 |
| 2007/0254601 | A1* | 11/2007 | Li | H04B 7/043 455/88 |
| 2008/0108310 | A1* | 5/2008 | Tong | H04B 7/0617 455/69 |
| 2008/0112504 | A1* | 5/2008 | Jiang | H04L 1/0618 375/296 |
| 2008/0207238 | A1* | 8/2008 | Tosato | H04B 7/04 455/507 |
| 2008/0227495 | A1* | 9/2008 | Kotecha | H04B 7/0417 455/562.1 |
| 2010/0208837 | A1* | 8/2010 | Vetter | H04B 7/0452 375/267 |
| 2011/0002411 | A1* | 1/2011 | Forenza | H04B 7/024 375/267 |
| 2011/0003606 | A1* | 1/2011 | Forenza | H04B 17/318 455/501 |
| 2011/0007850 | A1* | 1/2011 | Cao | H04B 7/0408 375/340 |
| 2011/0051636 | A1* | 3/2011 | Van Nee | H04B 7/0452 370/310 |
| 2011/0051832 | A1* | 3/2011 | Mergen | H04B 7/0452 375/267 |
| 2011/0058598 | A1* | 3/2011 | Gaur | H04L 25/0242 375/233 |
| 2011/0176439 | A1* | 7/2011 | Mondal | H04L 25/03343 370/252 |
| 2011/0205913 | A1* | 8/2011 | Van Zelst | H04B 7/043 370/252 |
| 2012/0076078 | A1* | 3/2012 | Han | H04L 1/06 370/328 |
| 2012/0082256 | A1* | 4/2012 | Gaur | H04B 7/0426 375/260 |
| 2012/0113897 | A1* | 5/2012 | Thiele | H04B 7/024 370/328 |
| 2012/0243424 | A1* | 9/2012 | Wang | H04B 7/024 370/252 |
| 2012/0252453 | A1* | 10/2012 | Nagaraja | H04W 52/243 455/436 |
| 2012/0252521 | A1* | 10/2012 | Nagaraja | H04W 52/243 455/522 |
| 2013/0079045 | A1* | 3/2013 | Ma | H04W 52/16 455/509 |
| 2013/0223555 | A1* | 8/2013 | Sheng | H04B 7/0452 375/267 |
| 2013/0301746 | A1* | 11/2013 | Mobasher | H04B 7/0456 375/267 |
| 2014/0056334 | A1* | 2/2014 | Khina | H04L 25/0204 375/211 |
| 2014/0140428 | A1* | 5/2014 | Khojastepour | H04L 25/03898 375/267 |
| 2014/0254495 | A1* | 9/2014 | Farmanbar | H04W 72/12 370/329 |
| 2014/0269547 | A1* | 9/2014 | Valliappan | H04W 16/02 370/329 |
| 2014/0362787 | A1* | 12/2014 | Mobasher | H04W 52/146 370/329 |
| 2015/0063223 | A1* | 3/2015 | Shen | H04W 52/265 370/329 |
| 2015/0172014 | A1* | 6/2015 | Zhao | H04L 25/0204 370/330 |
| 2015/0207547 | A1* | 7/2015 | Ko | H04B 7/0456 370/252 |
| 2015/0244418 | A1* | 8/2015 | Verbin | H04B 3/32 370/201 |
| 2015/0296439 | A1* | 10/2015 | Shen | H04W 40/246 370/255 |
| 2015/0304855 | A1* | 10/2015 | Perlman | H04W 16/14 370/280 |
| 2015/0326383 | A1* | 11/2015 | Wong | H04L 7/0012 375/267 |
| 2015/0333846 | A1* | 11/2015 | Morita | H04W 16/28 455/63.1 |
| 2015/0358099 | A1* | 12/2015 | Fujishiro | H04J 11/004 370/329 |
| 2016/0043783 | A1* | 2/2016 | Xia | H04B 7/0417 370/329 |
| 2016/0065344 | A1* | 3/2016 | Lee | H04B 7/0626 370/329 |
| 2016/0173175 | A1* | 6/2016 | Tomeba | H04B 7/0417 370/329 |

(56) References Cited

U.S. PATENT DOCUMENTS

| | | | |
|---|---|---|---|
| 2016/0212643 A1* | 7/2016 | Park | H04B 7/0626 |
| 2016/0295014 A1* | 10/2016 | Wei | H04M 3/34 |
| 2016/0323021 A1* | 11/2016 | Chen | H04B 7/0413 |
| 2016/0337015 A1* | 11/2016 | Fazlollahi | H04B 7/0456 |
| 2017/0134201 A1* | 5/2017 | Kim | H04B 17/336 |
| 2017/0163452 A1* | 6/2017 | Breiling | H04L 25/03159 |
| 2017/0288710 A1* | 10/2017 | Delfeld | H04L 25/0222 |
| 2017/0311322 A1* | 10/2017 | Kim | H04L 5/00 |
| 2018/0123657 A1* | 5/2018 | Kundargi | H04B 7/0452 |
| 2018/0287834 A1* | 10/2018 | Wesemann | H04L 25/497 |

FOREIGN PATENT DOCUMENTS

| | | |
|---|---|---|
| CN | 104753628 A | 7/2015 |
| WO | 2015/171958 A1 | 11/2015 |

OTHER PUBLICATIONS

Gu, Zheqi et al., "Robust Precoding in Massive MIMO Time Division Duplex Systems", Journal of Electronics & Information Technology, vol. 37, No. 5, May 31, 2015 (May 31, 2015), 7 pages.

Liang, Ning et al., "An Uplink Interference Analysis for Massive MIMO Systems with MRC and ZF Receivers", 2015 IEEE Wireless Communications and Networking Conference (WCNC), vol. /, No. /, Dec. 31, 2015 (Dec. 31, 2015), 7 pages.

International Search Report and Written Opinion PCT/CN2016/076829 dated Dec. 22, 2016, in International Patent Application No. PCT/CN2016/076829, 13 pages.

\* cited by examiner

US 10,236,958 B2

METHOD FOR SIGNAL TRANSMISSION TO MULTIPLE USER EQUIPMENTS UTILIZING RECIPROCITY OF WIRELESS CHANNEL

TECHNICAL FIELD

The present disclosure relates to multi-user multi-antenna systems in wireless communications, and more particularly, to a method for signal transmission to multiple User Equipments (UEs) utilizing reciprocity of a wireless channel.

BACKGROUND

As introduced by IEEE Trans. Wireless Commun., vol. 9, no. 11, pp. 3590-3600, 2010, by providing hundreds of antennas at a base station to serve tens of UEs simultaneously in the same time-frequency resource blocks, a massive MIMO system can greatly improve spectrum efficiency and energy radiation efficiency of a cellular network. In general, such massive MIMO system operates in a Time Division Duplex (TDD) mode, so as to utilize reciprocity between uplink and downlink channels to obtain Channel State Information (CSI) based on orthogonal uplink trainings, thereby significantly reducing pilot overheads due to channel training (the optimal pilot-based channel training requires orthogonality between pilot sequences transmitted from different antennas and thus a pilot length larger than or equal to the total number of transmitting antennas). The base station performs multi-user detection (in the uplink) or precoding (in the downlink) based on the estimated CSI to obtain a multiplexing gain or an array gain, thereby improving the effectiveness and reliability of information transmission. However, when the base station needs to broadcast control signaling or page inactive UEs, it cannot obtain the multiplexing gain or array gain due to lack of CSI for these UEs. On the other hand, in this case the orthogonal uplink channel trainings are not applicable (as it is impossible to guarantee the orthogonality between pilot sequences for different UEs when they are selected by the UEs autonomously). The pilot and feedback overheads for orthogonal downlink channel trainings are too costly to be acceptable. Hence, the transmission of broadcast signaling becomes quite challenging.

SUMMARY

An object of the present disclosure is to solve the problem in the related art associated with high overheads required for downlink channel training based on orthogonal pilots. In order to solve the above technical problem, a method for signal transmission is provided. The method is applied in a multi-user, multi-antenna system operating in a Time Division Duplex (TDD) mode and including a base station and a number, K, of User Equipments (UEs). The base station is configured with M antennas. Each UE is configured with one receiving antenna or configured to combine signals from a plurality of receiving antennas to obtain one scalar channel output. Each UE maintains ideal synchronization with the base station. One downlink transmission period is discretized into T timeslots. Reciprocal uplink and downlink channels remain unchanged during the T timeslots. An uplink channel from a UE k to the base station is denoted as $h_k$, and a downlink channel from the base station to the UE k is denoted as $h_k^\dagger$, where † denotes conjugate transpose.

The method includes:

S1: in the first timeslot, transmitting, by the UE k, a constant signal to the base station, such that a signal received by the base station is a simple addition of an uplink channel from the UE to the base station and a noise, i.e., $y_{BS}[1]=\Sigma_{k=1}^{K} h_k + z_{BS}[1]$, where $y_{BS}[1]$ denotes a signal received by the base station in the first timeslot and $z_{BS}[1]$ denotes a noise at the base station;

S2: in the second timeslot, multiplying, by the base station, the signal $y_{BS}[1]$ received in the first timeslot with a power adjustment factor a and feeding $ay_{BS}[1]$ back to all the UEs by means of broadcast, such that a signal received by a UE j in the second timeslot is $y_j[2]=h_j^\dagger a y_{BS}[1]+z_j[2] \triangleq g_j + z_j[2]$, where $z_j[2]$ is a noise at the UE j and $g_j = a(h_j^\dagger \Sigma_{k=1}^{K} h_k + h_j^\dagger z_{BS}[1])$, and the UE j estimates $g_j$ based on the signal $y_j[2]$ received in the second timeslot to obtain an estimated value $\hat{g}_j$; and S3: in the t-th timeslot, where t=3, . . . , T, precoding, by the base station, a signal $x_{BS}[t]$ to be broadcasted to the UEs in the t-th timeslot based on $ay_{BS}[1]$, and broadcasting $ax_{BS}[t]y_{BS}[1]$ to all the UEs, such that a signal received by the UE j in the t-th timeslot is $y_j[t]=g_j x_{BS}[t]+z_j[t]$, where $z_j[t]$ is a noise at the UE j, and the UE j demodulates $x_{BS}[t]$ based on $\hat{g}_j$.

In an embodiment of the present disclosure, in the step S1, the constant signal is normalized to a transmission power of the UE.

In an embodiment of the present disclosure, in the step S1, the noise $z_{BS}[1]$ at the base station is an independent and identically distributed Gaussian noise, i.e., $z_{BS}[1]\sim CN(0,\sigma_{BS}^2 I_M)$, where $\sigma_{BS}^2$ is a noise power at the base station, $I_M$ is an M-dimensional identity matrix, and $CN(0,\sigma_{BS}^2 I_M)$ denotes an M-dimensional cyclically symmetric complex Gaussian distribution having a mean value of 0 and a covariance matrix of $\sigma_{BS}^2 I_M$.

In an embodiment of the present disclosure, in the step S2, the power adjustment factor a satisfies $a=1/\sqrt{MK}$.

In an embodiment of the present disclosure, in the step S2, the noise $z_j[2]$ at the UE j is a Gaussian noise, i.e., $z_j[2]\sim CN(0,\sigma_{UE}^2)$, where $\sigma_{UE}^2$ is a noise power at the UE, and $CN(0,\sigma_{UE}^2)$ denotes a cyclically symmetric complex Gaussian distribution having a mean value of 0 and a covariance matrix of $\sigma_{UE}^2$.

In an embodiment of the present disclosure, in the step S2, $g_j$ is estimated using a least square method, i.e., $\hat{g}_j = y_j[2]$.

A method for transmitting a signal is also provided. The method is applied in a multi-user, multi-antenna system operating in a Time Division Duplex (TDD) mode and including a base station and a number, K, of User Equipments (UEs). The base station is configured with M antennas. Each UE is configured with one receiving antenna or configured to combine signals from a plurality of receiving antennas to obtain one scalar channel output. Each UE maintains ideal synchronization with the base station. One downlink transmission period is discretized into T timeslots Reciprocal uplink and downlink channels remain unchanged during the T timeslots. An uplink channel from a UE k to the base station is denoted as $h_k$, and a downlink channel from the base station to the UE k being denoted as $h_k^\dagger$. The method includes:

S1: in the first timeslot, transmitting, by the UE k, a constant signal to the base station, such that a signal received by the base station is a simple addition of an uplink channel from the UE to the base station and a noise, i.e., $y_{BS}[1]=\Sigma_{k=1}^{K} h_k + z_{BS}[1]$, where $z_{BS}[1]\sim CN(0,\sigma_{BS}^2 I_M)$ denotes a noise at the base station; and S2: in the t-th timeslot, where t=2, . . . , T, applying, by the base station, a differential modulation to data to be broadcasted to the UEs in the t-th timeslot, so as to obtain a modulated signal $x_{BS}[t]$ first, then precoding $x_{BS}[t]$ based on $y_{BS}[1]/\sqrt{MK}$, and broadcasting $y_{BS}[1]x_{BS}[t]/\sqrt{MK}$ to all the UEs, such that a signal received by a UE j in the t-th timeslot is $$y_j[t] = \frac{1}{\sqrt{MK}} h_j^\dagger y_{BS}[1] x_{BS}[t] \triangleq g_j x_{BS}[t] + z_j[t],$$

where $$g_j = \frac{1}{\sqrt{MK}} h_j^\dagger y_{BS}[1],$$

$z_j[t] \sim CN(0, \sigma_{UE}^2)$ is a noise at the UE j, and the UE j applies incoherent differential demodulation to the signal broadcasted from the base station without performing any explicit channel estimation.

A method for transmitting a signal is also provided. The method is applied in a multi-user, multi-antenna system comprising a base station and a plurality of User Equipments (UEs). The UEs are divided into a number of groups. The UEs in different groups occupy different sub-carriers and the UEs in each group transmit signals according to any of the above methods.

The present disclosure has prominent advantages such as simplicity in implementation, low processing complexity and very low channel training overhead and is particularly applicable in low-speed transmission of broadcast signaling in a massive MIMO system and scenarios where the base station is to page inactive UEs.

DETAILED DESCRIPTION

Figure 1:
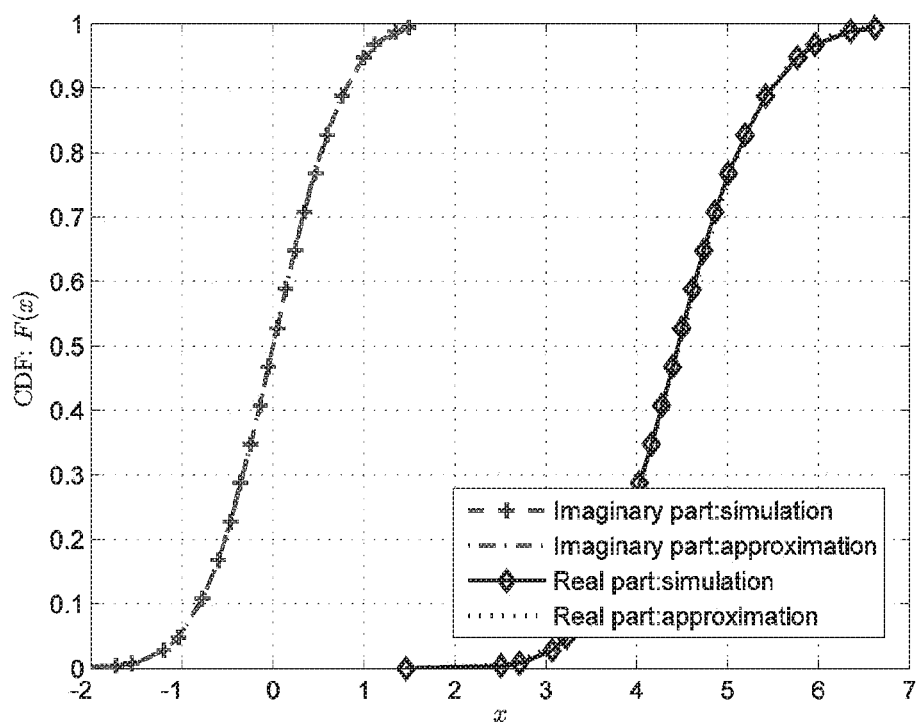
FIG. 1 shows an empirical cumulative density function of a real part and an imaginary part of an equivalent SISO channel $g_j$ between a base station and a UE when M=100, K=5, and a comparison with an asymptotic distribution CN ($\sqrt{20}$,1).

The present disclosure provides a method for transmitting a broadcast signal utilizing reciprocity of a wireless channel. It is a method for efficient transmission of downlink broadcast signaling. Its principle is to improve the reliability in transmission of the broadcast signaling by utilizing reciprocity between an uplink channel and a downlink channel in a TDD mode, while significantly reducing channel training overhead.

The present disclosure is applied in a multi-user, multi-antenna system operating in a TDD mode and comprising a base station and a number, K, of UEs. The base station is configured with M antennas. Each UE is configured with one receiving 30o antenna or configured to combine signals from a plurality of receiving antennas to obtain one scalar channel output. Each UE maintains ideal synchronization with the base station. One downlink transmission period is discretized into T timeslots. Reciprocal uplink and downlink channels remain unchanged during the T timeslots. If an uplink channel from a UE k to the base station is denoted as $h_k$, a downlink channel from the base station to the UE k is denoted as $h_k^\dagger$, where † denotes conjugate transpose.

At S1, in the first timeslot, all of the UEs transmit a same constant (as the UEs do not have CSI, they cannot perform uplink power control; the constant can be normalized to 1, without loss of generality; variations in transmission power of the UEs are reflected by adjusting noise power). A signal received by the base station in the first timeslot is a simple addition of an uplink channel from the UE to the base station and a noise, i.e., $y_{BS}[1] = \Sigma_{k=1}^{K} h_k + z_{BS}[1]$, where $z_{BS}[1] \sim CN(0, \sigma_{BS}^2 I_M)$ denotes an independent and identically distributed Gaussian noise at the base station, $\sigma_{BS}^2$ is a noise power at the base station. $I_M$ is an M-dimensional identity matrix, and CN $(0, \sigma_{BS}^2 I_M)$ denotes an M-dimensional cyclically symmetric complex Gaussian distribution having a mean value of 0 and a covariance matrix of $\sigma_{BS}^2 I_M$.

At S2, in the second timeslot, the base station multiplies the signal $y_{BS}[1]$ received in the first timeslot with a power adjustment factor $a=1/\sqrt{MK}$ and feeds $ay_{BS}[1]$ back to all the UEs by means of broadcast. A signal received by a UE j in the second timeslot is $y_j[2] = h_j^\dagger a y_{BS}[1] + z_j[2] \triangleq g_j + z_j[2]$, where $z_j[2] \sim CN(0, \sigma_{UE}^2)$ is a Gaussian noise at the UE and $g_j = a(h_j^\dagger \Sigma_{k=1}^K h_k + h_j^\dagger z_{BS}[1])$ can be considered as an equivalent Single Input Single Output (SISO) channel from the base station to the UE j. The UE j estimates the equivalent channel $g_j$, based on the received signal $y_j[2]$ to obtain an estimated value $\hat{g}_j$ (e.g., $\hat{g}_j = y_j[2]$ when a least square method is used).

At S3, in the t-th timeslot, where t=3, ..., T, the base station precodes a signal $x_{BS}[t]$ to be broadcasted to the UEs based on $ay_{BS}[1]$, and broadcasts $ax_{BS}[t]y_{BS}[1]$ to all the UEs. A signal received by the UE j in the t-th timeslot can be represented as $y_j[t] = g_j x_{BS}[t] + z_j[t]$. The UE j demodulates the signal $x_{BS}[t]$ broadcasted by the base station based on $\hat{g}_j$ estimated in the second timeslot.

The principle for the present disclosure to transmit a signal to multiple UEs utilizing reciprocity of the wireless channel is as follows.

In order to obtain CSI of a UE, a conventional downlink channel training based on orthogonal pilots occupies at least M timeslots. Since a base station in a massive MIMO system is typically configured with hundreds of antennas, i.e., M is typically on the order of $10^2$, and the typical channel coherent time is also on the order of $10^2$, such channel training has an unacceptable overhead.

In order to reduce the overhead of the downlink channel training, it is possible to use the same repetitive coding policy in the downlink channel training phase and data transmission phase. For a repetition factor r=M as an example, all the antennas at the base station can transmit the same pilot (in the downlink channel training phase) or data signal (in the downlink data transmission phase). In particular, in the first transmission timeslot, all the antennas at the base station transmit the same pilot (assuming it to be a constant $1/\sqrt{M}$, without loss of generality), and the signal received by a UE j is $y_j[1] = 1/\sqrt{M}(\Sigma_{m=1}^{M} h^*_{jm} + z_j[1])$, where $h^*_{jm}$ is the conjugate of $h_{jm}$. By doing so, the vector channel from the base station to the UE j is folded into an equivalent SISO channel. While such repetitive coding policy can significantly reduce the overhead of the downlink channel training, it is problematic in that the equivalent SISO channel and a SISO channel when the base station is configured with one single antenna have identical distributions (assuming $h_{jm}$, m∈{1, 2, ..., M} to be independent and identically distributed, without loss of generality). Hence, the repetitive coding policy with the repetition factor r=M can provide no diversity gain. When the repetition factor r is decreased, the repetitive coding policy can provide some diversity gain, which comes at expense of an increased overhead of the downlink channel training. For a low-speed transmission of broadcast signaling, it is desired to keep the channel training overhead as low as possible. Therefore, the downlink channel training based on the repetitive coding policy and the signaling broadcast have their limitations.

On the other hand, the method for transmitting a signal to multiple UEs utilizing reciprocity of the wireless channel according to the present disclosure can significantly improve the statistic distribution of the equivalent SISO channel between the base station and the UE, thereby improving the reliability in signaling broadcast. Meanwhile, as the downlink channel training only occupies two transmission timeslots, the overhead of the channel training is very low and particularly suitable for the low-speed transmission of downlink broadcast signaling. Its main principle will be explained in the following. For simplicity of analysis, it is assumed here, without loss of generality, that the elements in $h_k$ are independent from each other and subject to a cyclically symmetric complex Gaussian distribution CN (0,1) (i.e., Rayleigh fading). $g_j$ can be rewritten as:

$$g_j = \frac{1}{\sqrt{MK}}\|h_j\|^2 + \frac{1}{\sqrt{MK}}h_j^{\dagger}\left(\sum_{k \neq j}^{K} h_k + z_{BS}[1]\right).$$

It is easy to know that the first item is subject to a central Chi-square distribution having a 2M degrees of freedom and, according to the central limit theorem, the second item is asymptotically subject to a zero-mean cyclically symmetric complex Gaussian distribution. Further, as described above, M is typically on the order of $10^2$, thus the first item equals approximately to its mean value of $\sqrt{M/K}$ and the second item has approximately a cyclically symmetric complex Gaussian distribution CN (0,1). As above, with the two steps of channel training and estimation according to the present disclosure, the vector channel from the base station to the UE can be approximately equivalent to a Rician fading channel subject to a distribution of CN ($\sqrt{M/K}$,1). When compared with the channel training and the signal broadcast based on repetitive coding having the repetition factor r=M, the equivalent SISO channel derived according to the present disclosure has a Light-of-Sight (LOS) component which is strong when the ratio M/K is large (it is to be noted here that M is typically larger than K by one order of magnitude in the massive MIMO system). In this way, the reliability of signal broadcast can be greatly improved and the interruption probability can be reduced.

In the following, an embodiment of the present disclosure will be explained with reference to the figures.

This embodiment is applied in a narrow-band massive MIMO system and one single cell is assumed. Accordingly, the channel $h_k$ between the UE and the base station is subject to a flat fading. Without loss of generality, it is assumed that $h_k$ is subject to a Rayleigh fading CN (0,1). Further, it is assumed that an ideal synchronization is maintained between the UE and the base station.

FIG. 1 shows an empirical cumulative density function of a real part and an imaginary part of an equivalent SISO channel $g_j$ between a base station and a UE when M=100, K=5, and a comparison with an asymptotic distribution CN ($\sqrt{20}$,1).

It can be seen from FIG. 1 that, when the number of antennas at the base station is much larger than the number of UEs served, the equivalent SISO channel from the base station to the UE has a very strong LOS component. Thus, in this case the transmission of downlink broadcast signaling can be highly reliable and can have a high transmission rate.

Figure 2:
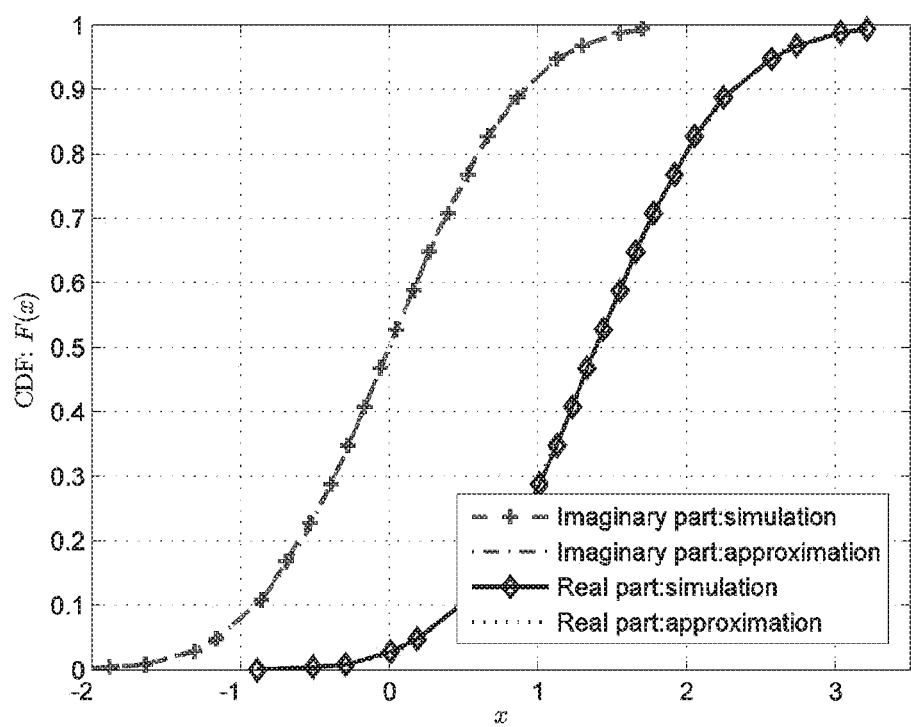
FIG. 2 shows an empirical cumulative density function of a real part and an imaginary part of $g_j$ when M=100, K=50, and a comparison with an asymptotic distribution CN ($\sqrt{2}$,1).
Figure 3:
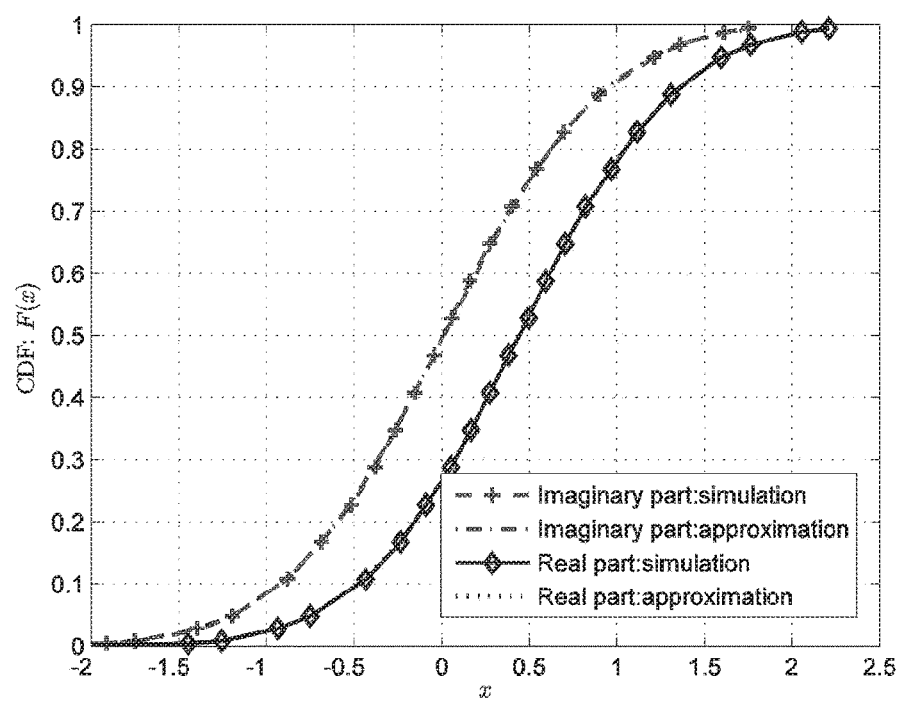
FIG. 3 shows an empirical cumulative density function of a real part and an imaginary part of $g_j$ when M=100, K=500, and a comparison with an asymptotic distribution CN ($\sqrt{0.2}$,1).

FIG. 2 shows an empirical cumulative density function of a real part and an imaginary part of $g_j$ when M=100, K=50, and a comparison with an asymptotic distribution CN ($\sqrt{2}$,1). FIG. 3 shows an empirical cumulative density function of a real part and an imaginary part of $g_j$ when M=100, K=500, and a comparison with an asymptotic distribution CN ($\sqrt{0.2}$,1). It can be seen from FIGS. 1-3 that, even if the base station is configured with only 100 antennas, the empirical distribution of $g_j$ highly matches its asymptotic distribution CN ($\sqrt{M/K}$,1). Further, as the ratio of the number of antennas at the base station to the number of UEs served decreases, the LOS component in the equivalent SISO channel from the base station to the UE attenuates continuously, but still superior to the channel training and the signal broadcast based on repetitive coding having the repetition factor r=M.

With better utilization of the reciprocity between the uplink and downlink channels in the TDD mode, the method according to the present disclosure not only occupies less timeslot resources (only two timeslots) during the channel training phase, but also significantly improves the statistic distribution of the equivalent SISO channel between the base station and the UE when M/K is large, thereby improving the reliability in transmission of the broadcast signal. Theoretically, the number of UEs the base station can serve at the same time is not limited by the number of antennas at the base station. The increase in the number of UEs only attenuates the LOS component in the equivalent SISO channel between the base station and the UE to some extent. Further, the method according to the present disclosure has low complexity in the processing at the base station. Hence, the method of the present disclosure is particularly applicable in low-speed transmission of downlink broadcast signaling and scenarios where the base station is to page inactive UEs.

While the objects, solutions and advantageous effects of the present disclosure have been descried in detail with reference to the above embodiments, it should be noted that the foregoing is illustrative only, rather than limiting the scope of the present disclosure. Any modifications, alternatives or improvements that can be made without departing from the spirit and principle of the present disclosure are to be encompassed by the scope of the present disclosure.

The invention claimed is:

1. A method for signal transmission, applied in a multi-user, multi-antenna system operating in a Time Division Duplex (TDD) mode and comprising a base station and a number, K, of User Equipments (UEs), the base station being configured with M antennas, each UE being configured with one receiving antenna or configured to combine signals from a plurality of receiving antennas to obtain one scalar channel output, each UE maintaining synchronization with the base station, one downlink transmission period being discretized into T timeslots, reciprocal uplink and downlink channels remaining unchanged during the T timeslots, an uplink channel from a UE k to the base station being denoted as $h_k$, a downlink channel from the base station to the UE k being denoted as $h_k^{\dagger}$, where † denotes conjugate transpose, the method comprising:

S1: in the first timeslot, transmitting, by the UE k, a constant signal to the base station, such that a signal received by the base station is a simple addition of an uplink channel from the UE to the base station and a noise, i.e., $y_{BS}[1]=\Sigma_{k=1}^{K}h_k+z_{BS}[1]$, where $y_{BS}[1]$ denotes a signal received by the base station in the first timeslot and $z_{BS}[1]$ denotes a noise at the base station;

S2: in the second timeslot, multiplying, by the base station, the signal $y_{BS}[1]$ received in the first timeslot with a power adjustment factor a and feeding $ay_{BS}[1]$ back to all the UEs by means of broadcast, such that a signal received by a UE j in the second timeslot is $y_j[2]=h_j^\dagger ay_{BS}[1]+z_j[2] \triangleq g_j+z_j[2]$, where $z_j[2]$ is a noise at the UE j and $g_j=a(h_j^\dagger \Sigma_{k=1}^{K} h_k + h_j^\dagger z_{BS}[1])$, and the UE j estimates $g_j$ based on the signal $y_j[2]$ received in the second timeslot to obtain an estimated value $\hat{g}_j$; and S3: in the t-th timeslot, where t=3, ..., T, precoding, by the base station, a signal $x_{BS}[t]$ to be broadcasted to the UEs in the t-th timeslot based on $ay_{BS}[1]$, and broadcasting $ax_{BS}[t]y_{BS}[1]$ to all the UEs, such that a signal received by the UE j in the t-th timeslot is $y_j[t]=g_j x_{BS}[t]+z_j[t]$, where $z_j[t]$ is a noise at the UE j, and the UE j demodulates $x_{BS}[t]$ based on $\hat{g}_j$.

2. The method of claim 1, wherein in the step S1, the constant signal is normalized to a transmission power of the UE.

3. The method of claim 1, wherein in the step S1, the noise $z_{BS}[1]$ at the base station is an independent and identically distributed Gaussian noise, i.e., $z_{BS}[1] \sim CN(0, \sigma_{BS}^2 I_M)$, where $\sigma_{BS}^2$ is a noise power at the base station, $I_M$ is an M-dimensional identity matrix, and $CN(0, \sigma_{BS}^2 I_M)$ denotes an M-dimensional cyclically symmetric complex Gaussian distribution having a mean value of 0 and a covariance matrix of $\sigma_{BS}^2 I_M$.

4. The method of claim 1, wherein in the step S2, the power adjustment factor a satisfies $a=1/\sqrt{MK}$.

5. The method of claim 1, wherein in the step S2, the noise $z_j[2]$ at the UE j is a Gaussian noise, i.e., $z_j[2] \sim CN(0, \sigma_{UE}^2)$, where $\sigma_{UE}^2$ is a noise power at the UE, and $CN(0, \sigma_{UE}^2)$ denotes a cyclically symmetric complex Gaussian distribution having a mean value of 0 and a covariance matrix of $\sigma_{UE}^2$.

6. The method of claim 1, wherein in the step S2, $\hat{g}_j$ is estimated using a least square method, i.e., $\hat{g}_j=y_j[2]$.

7. A method for signal transmission, applied in a multi-user, multi-antenna system comprising a base station and a plurality of User Equipments (UEs), the UEs being divided into a number of groups, the UEs in different groups occupying different sub-carriers and the UEs in each group transmitting signals according to the method of claim 1.

8. A method for signal transmission, applied in a multi-user, multi-antenna system operating in a Time Division Duplex (TDD) mode and comprising a base station and a number, K, of User Equipments (UEs), the base station being configured with M antennas, each UE being configured with one receiving antenna or configured to combine signals from a plurality of receiving antennas to obtain one scalar channel output, each UE maintaining synchronization with the base station, one downlink transmission period being discretized into T timeslots, reciprocal uplink and downlink channels remaining unchanged during the T timeslots, an uplink channel from a UE k to the base station being denoted as $h_k$, a downlink channel from the base station to the UE k being denoted as $h_k^\dagger$, the method comprising:

S1: in the first timeslot, transmitting, by the UE k, a constant signal to the base station, such that a signal received by the base station is a simple addition of an uplink channel from the UE to the base station and a noise, i.e., $y_{BS}[1]=\Sigma_{k=1}^{K}h_k+z_{BS}[1]$, where $y_{BS}[1]$ denotes a signal received by the base station in the first timeslot and $z_{BS}[1]$ denotes a noise at the base station; and S2: in the t-th timeslot, where t=2, ..., T, applying, by the base station, a differential modulation to data to be broadcasted to the UEs in the t-th timeslot, so as to obtain a modulated signal $x_{BS}[t]$ first, then multiplying the signal $y_{BS}[1]$ received in the first timeslot with a power adjustment factor a, precoding $x_{BS}[t]$ based on $ay_{BS}[1]$, and broadcasting $ax_{BS}[t]y_{BS}[1]$ to all the UEs, such that a signal received by a UE j in the t-th timeslot is $y_j[t]=h_j^\dagger ay_{BS}[1]x_{BS}[t] \triangleq g_j x_{BS}[t]+z_j[t]$, where $z_j[t]$ is a noise at the UE j, $g_j=a(h_j^\dagger \Sigma_{k=1}^{K}h_k+h_j^\dagger z_{BS}[1])$, and the UE j applies incoherent differential demodulation to the signal broadcasted from the base station without performing any explicit channel estimation.

9. The method of claim 8, wherein in the step S1, the constant signal is normalized to a transmission power of the UE.

10. The method of claim 8, wherein in the step S1, the noise $z_{BS}[1]$ at the base station is an independent and identically distributed Gaussian noise, i.e., $z_{BS}[1] \sim CN(0, \sigma_{BS}^2 I_M)$, where $\sigma_{BS}^2$ is a noise power at the base station, $I_M$ is an M-dimensional identity matrix, and $CN(0, \sigma_{BS}^2 I_M)$ denotes an M-dimensional cyclically symmetric complex Gaussian distribution having a mean value of 0 and a covariance matrix of $\sigma_{BS}^2 I_M$.

11. The method of claim 8, wherein in the step S2, the power adjustment factor a satisfies $a=1/\sqrt{MK}$.

12. The method of claim 8, wherein in the step S2, the noise $z_j[2]$ at the UE j is a Gaussian noise, i.e., $z_j[2] \sim CN(0, \sigma_{UE}^2)$, where $\sigma_{UE}^2$ is a noise power at the UE, and $CN(0, \sigma_{UE}^2)$ denotes a cyclically symmetric complex Gaussian distribution having a mean value of 0 and a covariance matrix of $\sigma_{UE}^2$.

13. A method for signal transmission, applied in a multi-user, multi-antenna system comprising a base station and a plurality of User Equipments (UEs), the UEs being divided into a number of groups, the UEs in different groups occupying different sub-carriers and the UEs in each group transmitting signals according to the method of claim 8.

* * * * *